United States Patent [19]

Allsop

[11] Patent Number: 4,486,916

[45] Date of Patent: Dec. 11, 1984

[54] PHONORECORD CLEANER

[75] Inventor: Ivor J. Allsop, Bellingham, Wash.

[73] Assignee: Allsop, Inc., Bellingham, Wash.

[21] Appl. No.: 311,639

[22] Filed: Oct. 15, 1981

[51] Int. Cl.³ .............................................. G11B 3/58
[52] U.S. Cl. ................................... 15/246; 15/210 R; 369/72
[58] Field of Search ............ 15/209 R, 209 D, 210 R, 15/210.5, 219, 220 R, 230, 246, 143 R, 144 R, 104 R, 104 A, 104.94, 214; 369/72-74, 271

[56] References Cited

U.S. PATENT DOCUMENTS 3,958,292  5/1976  Powell .............................. 15/104 A Primary Examiner—Edward L. Roberts Attorney, Agent, or Firm—Hughes, Barnard & Cassidy

[57] ABSTRACT

A phonorecord cleaner is comprised of a handle member journalled for relative rotational movement with a phonorecord contact member, the latter including a phonorecord contact face having a wiping surface which is substantially equal to the radial dimension of the grooved recording band of a phonorecord, wherein movement of the cleaner in an arcuate path corresponding generally to the orientation of the spiral groove pattern maintains uniform contact of the wiping surface across the recording band of the phonorecord. A positioning member is preferably included to center the cleaner over the recording band and maintain proper orientation of the wiping surface with respect thereto during the cleaning operation.

19 Claims, 2 Drawing Figures

U.S. Patent  Dec. 11, 1984  4,486,916
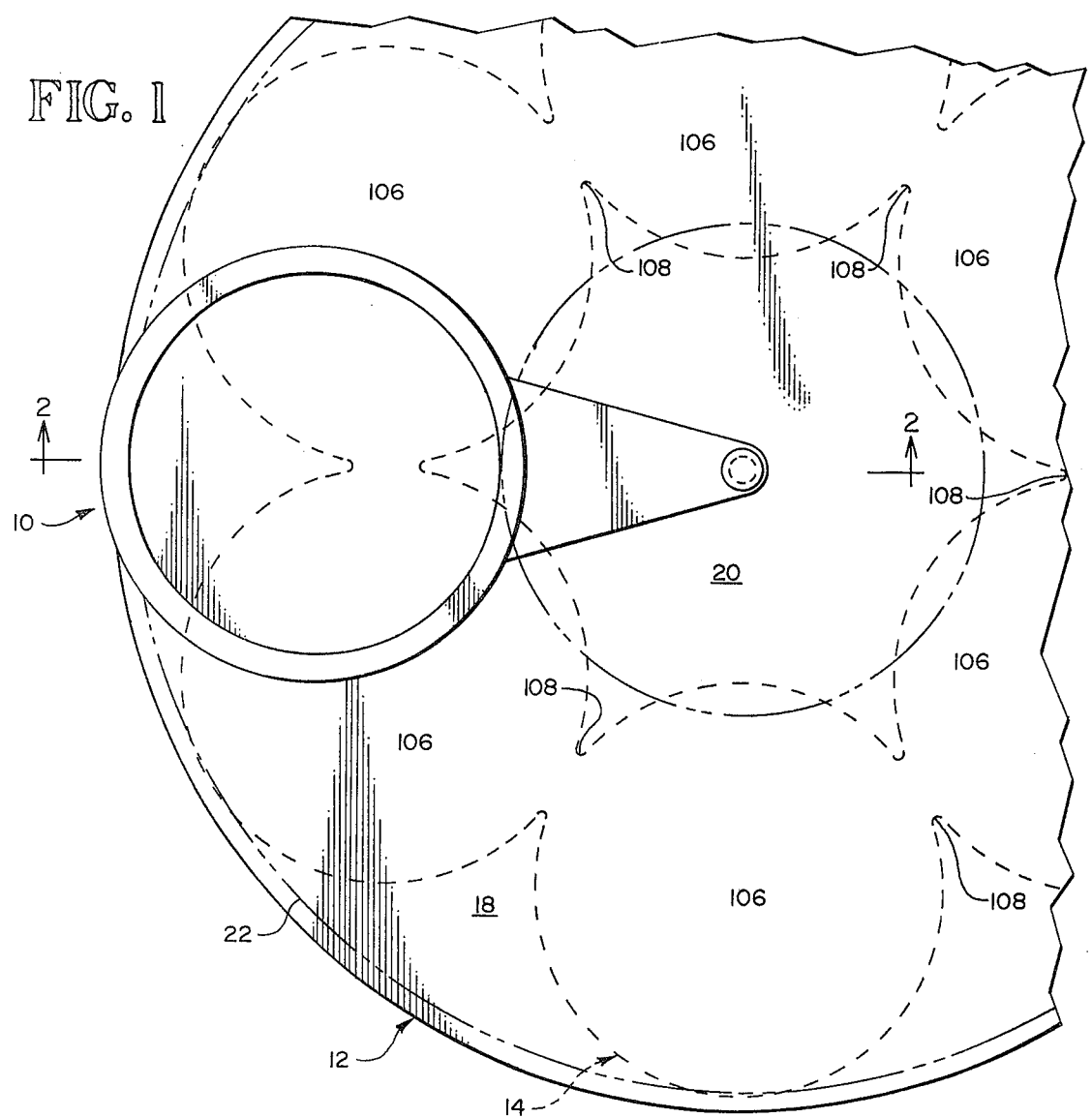
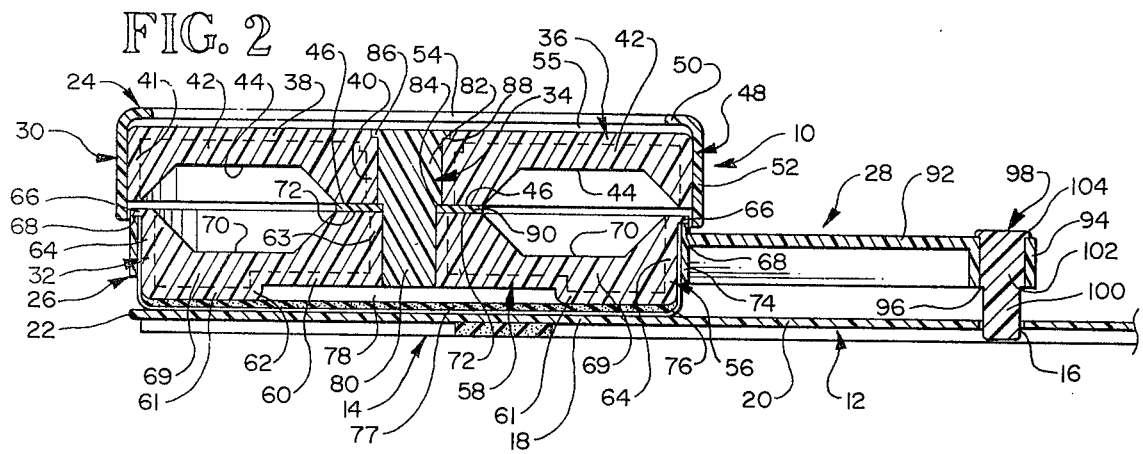

PHONORECORD CLEANER

BACKGROUND OF THE INVENTION

1. Field of the Invention

The present invention relates, generally, to phonorecord cleaners and, more especially, to an improved phonorecord cleaner having a handle member journalled for relative rotational movement with respect to a phonorecord contact member whereby movement of the cleaner device in an arcuate path corresponding generally to the spiral groove pattern on a phonorecord maintains uniform contact between a wiping surface on the cleaner and the grooves in the recording band of the phonorecord.

2. Description of the Background Art

Phonorecords have long enjoyed wide-spread popularity as a convenient means for sound reproduction. Recordings of musical compositions or the like are conventionally reproduced for mass distribution in the form of phonorecords. Customarily, the phonorecord is manufactured from a vinyl material in the form of a disc having a center aperture for positioning the phonorecord on the spindle of a record player or record changer, a recording band in the form of a spiral groove proceeding from a location near the outer periphery of the disc radially inward, and smooth areas where no sound or information is recorded at the extreme periphery of the disc and between the recording band and the center aperture.

It is important to maintain the grooved or recording band area of a phonorecord free from dust or other debris which tends to accumulate during use. These particles often attracted to the record due to static electric charges developed in the vinyl material from which it is made, interfere with the accurate reproduction of the sound information recorded on the phonorecord thereby resulting in a loss of fidelity. These dust particles or other debris must be removed routinely to insure faithful sound reproduction.

Various devices have been proposed for cleaning phonorecords to alleviate the problems attendant collection of dust or the like within the grooves of the record. These proposals range from a simple wiping cloth moved by hand around or across the face of the phonorecord to fairly complicated mechanical devices which automatically rotate and clean the record surfaces.

U.S. Pat. No. 3,472,517 discloses one approach for cleaning a phonograph record. This device consists of a pair of frames having opposing faces covered with a fabric such as velvet. A phonorecord to be cleaned is disposed between the frame members which are then closed to cause the fabric to come in contact with the grooved surfaces of the record. The record is then rotated and debris removed.

Another similar appliance is exemplified in U.S. Pat. No. 3,150,401. This device is designed to receive a portion of a phonorecord in a slot between a pair of brushes and includes means to rotate the record automatically in order to clean the recording band thereof. The device of this '401 patent also has an electric fan which removes the dust or other particulate as it is dislodged from the record grooves.

A manual cleaning device is disclosed in U.S. Pat. No. 2,977,127. This cleaner has a pair of arms hinged at one end so that they may be folded into contact with the grooved area of a phonorecord. One of the arms terminates in a pin and the other in an aperture for receipt thereof when the device is in a folded position. The pin is inserted through the center aperture in the phonorecord, the cleaner is folded into mating engagement with the vinyl record and it is then rotated manually for the removal of debris. A very similar device is disclosed in U.S. Pat. No. 1,261,688.

The patented devices described above are far preferable to the common practice of merely wiping a phonorecord with a cloth material since each of the patented cleaners presents a cleaning surface which will "track" with the grooves in the phonorecord as opposed to moving across grooves, as inherently occurs when wiping with a cloth. However, these devices nonetheless have certain drawbacks. The cleaners disclosed in U.S. Pat. Nos. 2,977,127 and 1,261,688 require the user to grasp a portion of the phonorecord in order to rotate it for cleaning. The need to grasp the record results in fingerprints and the deposition of oil from the skin which then serves as a means to attract further debris. The device disclosed in U.S. Pat. No. 3,150,401 is mechanically quite complicated and, hence, expensive to manufacture and/or prone to failure. Use of any of the cleaners discussed above requires the phonorecord to be removed from the record changer which is not always convenient.

Accordingly, the need exists for an improved phonorecord cleaner of simplified construction which nonetheless efficiently removes debris from the recording band or grooved area of a phonorecord in a convenient manner.

SUMMARY OF THE INVENTION

The phonorecord cleaner of the present invention advantageously provides a means for the efficient removal of debris, such as dust, from the surface of a phonorecord by means of a simple yet highly reliable device. Advantageously, the present invention provides a phonorecord cleaner where the wiping surface is maintained in uniform contact with the grooves in a phonorecord, substantially precluding wiping action across the grooves. The record cleaner of the present invention is further desirable for its sturdy construction, having a minimum number of moving parts and attendant reliability.

These, and other, advantages are provided by a phonorecord cleaner comprised of a handle member journalled for relative rotational movement with respect to a phonorecord contact member which includes a contact face bearing a wiping surface for cleaning contact with the recording band of a phonorecord. In a preferred embodiment the handle member and contact member are each disc-like in form, joined for rotational movement by an axle. A positioning member is provided to center the wiping surface over the recording band of the phonorecord and to fix its orientation with respect thereto. Consequently, when the handle disc is grasped and the cleaner moved in an arcuate path around the surface of the phonorecord, the wiping surface is maintained in uniform contact with the grooves in the record. The wiping surface itself is fabricated from a fabric having a resilient fiber structure and surface fibers which stand up well for projection into the grooves. The combination of fabric characteristics and the positioning means minimizes any tendency for wiping action across the grooves while maximizing the cleaning action in the direction of the grooves.

Other advantages of the present invention will become apparent to those skilled in the art upon examination of the following detailed description taken in conjunction with the figures of drawing, wherein:

BRIEF DESCRIPTION OF THE DRAWINGS

FIG. 1 is a fragmentary top plan view of a record cleaner in accordance with the present invention in contact with one face of a phonorecord which is resting on a stabilizing pad, shown in phantom lines; and, FIG. 2 is a sectional view taken substantially along the line 2—2 of FIG. 1.

DETAILED DESCRIPTION OF THE INVENTION

The present invention relates to phonorecord cleaners and will be described with reference to certain preferred embodiments thereof. However, those skilled in the art will appreciate that such a description of preferred embodiments is meant to be illustrative only, and should not be deemed limitative of the scope of the present invention.

Turning to the figures of drawing, in each of which like parts are identified with like reference numerals, the phonorecord cleaner of the present invention, designated generally as 10, is shown in FIG. 1 in engagement with a phonorecord designated generally as 12. In the embodiment shown in the figures of drawing, record 12 is supported on a pad 14, described more fully hereinbelow. As is customary, phonorecord 12 is made from a vinyl-type material, having an aperture 16 for centering the record on a spindle (not shown) of a phonorecord player. The phonorecord has a recording band 18 comprised of a spiral groove within which is impressed the sound information for reproduction. A smooth area 20 extends between centering aperture 16 and grooved area 18, and a similar smooth area 22 is located between the periphery of record 12 and the recording band.

The cleaner 10 of the present invention, best viewed in FIG. 2, is comprised of a handle means, designated generally as 24, journalled for relative rotational movement with respect to a phonorecord contact means, designated generally as 26, and a positioning means, designated generally as 28, for aligning the cleaner 10 over the recording band 18. In the preferred embodiment shown in the figures, each of the handle means 24 and phonorecord contact means 26 is a disc-shaped member, 30 and 32, respectively; albeit, other configurations might equally well be employed to achieve the advantages of the present invention provided such an alternate construction permits relative rotation between the upper and lower members comprising the cleaner. The two discs rotate about an axle means 34, such as a pin.

Upper disc 30 provides a convenient place to grasp the cleaner 10 when it is desired to clean a phonorecord. As ease of grasping the cleaner is a principal objective in the design of this upper handle member, it may be suitable simply to employ a knob rather than the larger disc. However, somewhat greater control is provided when the handle is in the form of a disc as shown and described herein. In the preferred embodiment shown in FIG. 2, disc 30 is comprised of an inner frame member 36 having a generally circular top face 38 and inner and outer walls 40 and 41, respectively, depending downwardly therefrom. Four interior stiffening walls, 42 (two of which are shown in FIG. 2), extend radially between, and join, walls 40 and 41; the stiffeners 42 being spaced equidistant about the interior of frame 36. In the embodiment shown, the stiffeners 42 include an outwardly offset notch 44 beginning at the outermost radial position generally coincident with the lower end of wall 41 and terminating intermediate the radius of the disc to yield a stiffened bearing face 46 extending outwardly from inner wall 40. An annular cover ring 48 is disposed over the frame 36. Ring 48 includes a fairly narrow circular top face 50 which merges to a downwardly depending skirt 52. A hole or central aperture 54 is thereby yielded over a portion of the top face 38 of frame 36. The inner diameter of ring 48 is preferably slightly less than the outer diameter of frame 36 so that the former may be press fit into engagement with the latter. Preferably, a piece of decorative material 55, which may be paper, fabric, leather, or the like, of generally circular form is placed over the top face 38 of frame 36 prior to assembly with ring 48 to improve the aesthetic appearance of the cleaner 10.

The lower disc 32 is provided to present a phonorecord contact surface for wiping dust or other particulate material from the surface of record 12. Disc 32 includes an inner frame member 56 which has a bottom, raised or stepped face 58 comprised of a first inner circular segment 60 and an outer circular segment 61 joined at a step 62. Frame 56 is formed with inner and outer walls 63 and 64, respectively, depending upwardly from the faces 60 and 61 respectively. The wall 64 terminates at its extreme upper end in an outwardly directed lip 66 which provides a peripheral ridge 68 outwardly adjacent wall 64. Frame 56 has four interior stiffening walls 69 corresponding in general shape and function to stiffening walls 42 in frame 36. Likewise, each wall 69 includes an outwardly offset notch 70 corresponding to the notches 44 described above. Thus, a stiffened bearing face 72 is formed extending outwardly from wall 63 which corresponds to the bearing face 46 in the upper disc 30.

The positioning means 28 of cleaner 10 serves to align the cleaner over the recording band 18 of the phonorecord and, in the preferred embodiment shown, also cooperates with lower disc 32 in the assembly to provide a convenient way to secure a wiping fabric in place. Dealing with this latter function first, positioning means 28 includes a circular ring 74 disposed outwardly proximate wall 64. A piece of cleaning fabris 76 is stretched across the bottom face 58 and is captured intermediate the circular ring 74 and outer wall 64. The fabric 76 comprises a wiping surface for direct contact with the recording band 18 of the phonorecord 12. Optionally, but preferably, a thin sheet of foamed polymer 77 is disposed intermediate fabric 76 and the face 58 to provide some cushioning for and added resiliency to the wiping surface. Preferably, the inner diameter of ring 74 is only slightly larger than the outer diameter of wall 64, the gap between the two being dimensioned for a tight fit when the fabric 76, with or without foam sheet 77, is in place. Thus, the lower disc 32 is assembled by stretching the fabric 76, along with foam sheet 77 (if present), across the frame member 56 and then force fitting ring 74 into butting engagement with ridge 68. This secures fabric 76 in a tightly stretched state in direct contact with the outer or circumferential face 61 of the bottom wall 58. A cavity 78 is thus formed between the wiping surface and the inner recessed face 60 of the frame to provide a space between the bottom of the axle means 34 and the face of phonorecord 12. When the cleaner 10 is employed to remove debris from the record, direct force contact will be made across the outer circular portion 61; although the tension existing in fabric 76 and foam sheet 77 across the recessed face portion 60 will nonetheless provide surface contact between the record and the wiping surface at this location. Accordingly, virtually complete contact across the entire bottom surface of cleaner 10 is made with the record while guarding against the possibility of scratching which could occur were axle means 34 to project entirely through the cleaner.

Upper and lower discs 30 and 32 are journalled for relative rotational movement by means of axle member 34 so that the two discs may spin freely. Axle 34 is shown in the preferred embodiment of FIG. 2 as a double-stepped cylindrical pin having a lower shank portion 80 and an upper shank portion 82 stepped at 84 to increase the diameter slightly. Upper portion 82 is also stepped at its extreme upper end to provide a circular rim 86. The pin 34 is received in a set of apertures in the upper and lower discs 30 and 32, formed interiorly of the inner walls in each member, 40 and 63, respectively. The diameter of the lower portion 80 of pin 34 is slightly oversized with respect to the inner diameter of the aperture formed interiorly adjacent annular wall 63 to provide a snug press fit connection between the pin and the frame 56. Conversely, the outer diameter of the upper portion 82 of pin 34 is slightly less than the inner diameter of the aperture formed immediately adjacent wall 40 so that the frame 36 may rotate freely about the pin. The upper stepped portion or rim 86 on the pin cooperates with a groove 88 formed in top face 38 to prevent displacement of the two discs when the pin or axle 34 is press fit to join these members together. Alternately, rather than forming pin 34 as a separate element for insertion within the registering apertures in discs 30 and 32, it might be made integral with disc 32 and have a length sufficient to project upwardly through the aperture in disc 30. In order to secure the two discs together, the end of the pin could be headed to form a mushroom-type ridge or a split ring could be secured thereon. Other designs will occur to those skilled in the art, the important aspect being the ability of the two discs to rotate freely in a relative sense.

A spacer or washer 90 is disposed intermediate the bearing surfaces 46 and 72 to separate the discs 30 and 32 and to provide for smoother rotation between these members. The washer 90 is preferably fabricated from a material having a low coefficient of friction, such as those materials marketed under the trade names TEFLON or DELRIN, the latter being highly preferred. Thus, washer 90 spaces the two discs and provides a smooth bearing surface for free relative rotation thereof.

The positioning means 28 includes an arm 92 extending from ring 74 and terminating in a circular collar 94. Collar 94 defines a circular bore or aperture 96 within which may be received a centering pin 98 as shown in FIG. 2. The diameter of aperture 96 is most preferably only slightly greater than that of a conventional record changer spindle, so that the spindle may project through the collar as explained below. Centering pin 98 is formed in a double-step configuration having a lower pin portion 100 and an upper pin portion 102 terminating in a circular cap 104. The diameter of lower pin portion 100 is slightly less than the inner diameter of centering aperture 16 in phonorecord 12, whereas the diameter of the upper portion 102 is dimensioned for a slight interference fit within aperture 96. Pin 98 is preferably fabricated from a relatively soft polymeric material, such as that marketed under the trade name KRATON, to minimize the possibility that the pin will scratch the vinyl material from which the phonorecord 12 is made. This also permits relatively easy removal of pin 98 from collar 94 for reasons explained below.

When the cleaner 10 is assembled in the exemplary embodiment illustrated in the figures of drawing, its operation is simple and yet highly efficient. The device is positioned over the phonorecord 12 as shown in FIG. 1 with pin 98 in the center aperture 16 of the record. The positioning means 28 insures appropriate alignment of the wiping surface provided by fabric 76 over the recording band 18 of the record. The disc 30 is grasped and the device 10 is then rotated in circular path following generally the orientation of the grooves in area 18. The diameter of the wiping surface is preferably only slightly greater than the radial dimension of the recording band 18 to provide contact with all of the grooves and proper removal of debris. As the device is rotated, the upper disc 30 is free to turn in the user's hand while the orientation of the bottom disc 32 remains fixed vis-a-vis the record grooves by virtue of the linkage with centering pin 98 provided by arm 92 and ring 74. Alternately, the record might be cleaned while still on the turntable. If this mode of operation is desired, the pin 98 is removed and the collar 94 is slipped over the spindle (not shown) which itself provides a pivot about which the cleaner may be rotated.

Another factor contributing to uniform tracking of the cleaner with the grooves in the recording band is the relationship of the bearing areas 46 and 72 to the circumferential contact face 61. Whatever downward force is applied to the upper disc or handle member 30 (even if in the form of a knob) is transmitted across the bearing areas 46, 72 to the lower disc 32 and, in turn, is distributed about contact face 61. Because the radial displacement from the axle pin 34 is greater for face 61 than that for bearing surfaces 46, 72, the moment arm at the rotational joint is shorter than that at the contact surface. Furthermore, the low-friction joint provided by spacer/washer 90 will have a much lower coefficient of friction than the coefficient of friction of the fabric 76 for the vinyl record 12. Accordingly the combination of a short moment arm and lower coefficient of friction at the rotational joint as compared with the longer moment arm and higher coefficient of friction at the contact surface minimizes any tendency for rotation of the handle member to be translated into rotation of the contact member. Hence, better tracking of the cleaning surface with the grooves is realized, even if the downward force on the handle is imbalanced across its top face. Within the broad aspects of this feature of the invention, it is contemplated that the ratio of the moment arms of the contact face to the bearing areas will lie in the range of from about 1.5:1 to about 4.5:1; preferably nearer the high end, in the range of from about 3:1 to about 4:1; and most preferably about 3.5:1.

The fabric comprising the wiping surface is selected from available materials which have surface fibers capable of projecting downwardly into the grooves of the record, which will stand up well to provide good brushing action when the cleaner is in use, and which are not inclined to mat. A particularly preferred material for this purpose is ordinary velvet. Consequently, as the device 10 is moved in its arcuate path to complete a wiping cycle of the phonorecord, there is little if any tendency for wiping across individual grooves and the cleaning action is principally in the groove direction. When velvet is the selected material for the wiping surface, the phonorecord may first be treated with a liquid anti-static compound to maximize the effectiveness of the treatment. Also, velvet is desirable since debris deposited on the wiping surface may be easily removed from cleaner 10 by simply brushing the velvet material.

When the phonorecord is removed from the turntable for cleaning, as described above, the support pad 14 illustrated in the figures is preferably employed so that the user need not physically touch the record during the cleaning process.

Pad 14 is provided to support record 12 during the cleaning operation and prevent its movement as the cleaner 10 is passed over its surface. A preferred pad structure is shown in the figures to be comprised of a number of circular discs 106, six such discs being shown in phantom lines in FIG. 1, joined together along adjacent arc sections 108. More or fewer than six such discs could be used but, regardless, it is preferable to join the circular elements such that a line connecting their centers defines a regular polygon; the polygon being a hexagon in the exemplified embodiment. The pad 14 is preferably constructed from a synthetic rubber or other material having a soft, resilient surface which presents a high coefficient of friction against vinyl or whatever other material is used to make the record. Preferably the arc sections 108 are made to be weakened fold lines so that the pad 14 may be folded repeatedly into a form appearing as a stack of circular pieces to take up a minimum amount of space when not in use. When it is desired to clean a record, the pad 14 may be unfolded into the configuration shown in FIGS. 1 and 2, and the record placed thereover, being raised sufficiently on the pad to permit the bottom portion 100 of the centering pin to engage the aperture 16 and permit movement of the cleaner 10 about the record while it is cushioned.

Fabrication of the instant record cleaner is simple. The disc member components are preferably fabricated from polymeric material which is easily molded and which is sturdy; ABS plastic being a highly preferred construction material. The components are easily assembled into the interference fit relationships noted above. Using the preferred construction materials in the preferred design disclosed herein yields a very durable cleaner having a minimum number of moving parts so that service life is enhanced. Accordingly, a simple yet highly efficient record cleaner is provided.

While the invention has now been described with reference to certain preferred embodiments thereof, those skilled in the art will appreciate that various substitutions, changes, modifications, and omissions may be made without departing from the spirit thereof. For example, while many benefits are realized by securing positioning means 28 to the lower disc 32, the positioning arm might be eliminated while retaining only ring 74 or other similar means to hold the wiping cloth in place. The modified cleaner resulting from that omission will still suitably clean the phonorecord although sacrificing to some extent the advantage of insuring cleaning principally only in the direction of the grooves. In some cases, this may not be an important consideration to the user; albeit, the relationship explained above respecting the moment arms and coefficients of friction at the rotational joint and cleaning face will reduce the tendency for gross movement of the wiping surface across the grooves. Likewise, there may be applications where it is not important or is otherwise undesirable to clean the entire recording band but only a circular segment thereof. In that case, the transverse dimension of the cleaner may be made smaller and the arm 92 made adjustable (e.g., two telescoping arms) to position the cleaning surface of the thus-modified cleaner at the desired location. Accordingly, it is intended that the scope of the present invention be limited solely by that of the following claims.

What is claimed is:

1. A phonorecord cleaner for removing debris from a phonorecord having a radially extending recording band in the form of a spiral groove pattern, said cleaner comprising:
   (a) handle means for grasping the phonorecord cleaner and moving same in an arcuate path around the recording band of a phonorecord; and,
   (b) phonorecord contact means having a phonorecord contact face including a generally planar wiping surface, the transverse dimension of which is substantially equal to the radial dimension of said recording band to be cleaned, journalled about central axle means disposed along a coincident rotational axis generally normal to said contact face for relative rotational movement of said handle means with respect to said contact means.

2. The phonorecord cleaner of claim 1, further comprising positioning means integral with and configured for aligning said contact means substantially coincident with said recording band to be cleaned and maintaining alignment between said wiping surface and said phonorecord during a cleaning operation.

3. The phonorecord cleaner of claim 2, wherein said handle means is comprised of a first disc and said phonorecord contact means is comprised of a second disc, and further wherein said first and second discs are journalled for relative rotational motion about axle means disposed through said discs.

4. The phonorecord cleaner of claim 3, wherein said positioning means is comprised of an arm secured at one end to said contact means and having a collar at it other end.

5. The phonorecord cleaner of claim 4, wherein said collar has an inner diameter slightly greater than the diameter of the spindle on a record changer whereby said spindle may project through said collar.

6. The phonorecord cleaner of claim 4, further comprising a pin disposed through said collar for projection through the centering aperture in a phonorecord.

7. The phonorecord cleaner of claim 5 or 6, wherein said second disc comprises a frame having a bottom face and a peripheral, circular side wall, and said wiping surface is comprised of a fabric disposed over said bottom face and at least partially overlapping said circular side wall, said fabric being secured on said second disc by an annular ring disposed outwardly adjacent said circular side wall.

8. The phonorecord cleaner of claim 7, wherein said arm extends outwardly from said annular ring.

9. The phonorecord cleaner of claims 5 or 6, wherein each of said discs is formed with a central aperture therein and said axle means comprises a pin disposed through said apertures.

10. The phonorecord cleaner of claim 9, wherein said first disc has a bearing surface extending radially outwardly from the lower end of said central aperture therein and said second disc has a bearing surface extending radially outward from the upper end of said central aperture therein, said cleaner further comprising a spacing washer intermediate said bearing surfaces.

11. The phonorecord cleaner of claims 1 or 2, wherein said handle means and said contact means are journalled for rotation about an axle and include opposing bearing faces extending radially outward from a position outwardly adjacent said axle and having a bearing radius dimension, and wherein said contact face is a generally circular face having a contact face radius dimension greater than said bearing radius dimension whereby the moment arm of said bearing faces is shorter than the moment arm of said contact face.

12. The phonorecord cleaner of claim 11, wherein the ratio of the lengths of the moment arm of said contact face to that of said bearing faces is in the range of from about 3:1 to about 4:1.

13. In combination with the phonorecord cleaner of claim 1, 2, or 6, a phonorecord support pad for placement beneath a phonorecord to be cleaned off a turntable for the phonorecord.

14. The combination of claim 13, wherein said support pad is fabricated from a resilient polymer having a high coefficient of friction for the material from which said phonorecord is made, said pad providing means for supporting said phonorecord in a fixed, generally horizontal position when said cleaner is moved across the opposing face thereof.

15. The combination of claim 13, wherein said support pad is comprised of a plurality of circular members joined together along arc segments thereof and wherein a line connecting the centers of said circular members defines a regular polygon.

16. The combination of claim 15, wherein said arc segments are fold lines about which said circular members may be folded.

17. A phonorecord cleaner comprising upper and lower discs rotatably secured by an axle pin, said lower disc including a frame having a bottom face and an upstanding, peripheral circular wall; a cleaning fabric stretched over said bottom face and extending at least partially over said circular wall; an annular ring disposed over said circular wall capturing and securing said fabric; and arm joined to said lower disc at its first end, projecting outwardly therefrom and terminating at its distal end in a collar, said arm having a length approximately equal to the distance between the recording band on a phonorecord and the center aperture thereof, whereby said bottom face is positioned substantially over the entire radial extent of said recording band when said collar is aligned with said center aperture; and means for aligning said collar with said center aperture and maintaining alignment while said cleaner is moved around the recording band for cleaning same.

18. In combination with the phonorecord cleaner of claim 17, a phonorecord support pad comprised of six circular, synthetic rubber discs joined together along common arc segments, wherein a line connecting the centers of said discs describes a hexagon.

19. The phonorecord cleaner of claim 17, wherein said fabric is velvet and further wherein a layer of foamed polymer is disposed intermediate said velvet and said bottom face.

* * * * *